United States Patent
Shimagaki

(10) Patent No.: US 8,340,653 B2
(45) Date of Patent: Dec. 25, 2012

(54) COMMUNICATION TERMINAL APPARATUS AND COMMUNICATION METHOD

(75) Inventor: Junji Shimagaki, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 51 days.

(21) Appl. No.: 13/010,520

(22) Filed: Jan. 20, 2011

(65) Prior Publication Data

US 2011/0237229 A1 Sep. 29, 2011

Related U.S. Application Data

(60) Provisional application No. 61/318,067, filed on Mar. 26, 2010.

(51) Int. Cl.
*H04M 3/00* (2006.01)
(52) U.S. Cl. ............ 455/419; 455/414.1; 455/420; 455/466; 382/118; 709/216; 709/217
(58) Field of Classification Search .......... None
See application file for complete search history.

(56) References Cited

U.S. PATENT DOCUMENTS

| | | | |
|---|---|---|---|
| 7,783,290 B2* | 8/2010 | Kim | 455/433 |
| 2006/0063514 A1* | 3/2006 | Choi et al. | 455/414.1 |
| 2009/0006484 A1 | 1/2009 | Wang | |
| 2009/0023472 A1* | 1/2009 | Yoo et al. | 455/556.1 |
| 2009/0037477 A1* | 2/2009 | Choi et al. | 707/104.1 |
| 2009/0154677 A1* | 6/2009 | Kunii et al. | 379/142.06 |
| 2010/0021086 A1 | 1/2010 | Wang et al. | |
| 2010/0162171 A1* | 6/2010 | Felt et al. | 715/835 |
| 2010/0216441 A1* | 8/2010 | Larsson et al. | 455/415 |
| 2011/0026778 A1* | 2/2011 | Ye | 382/118 |

FOREIGN PATENT DOCUMENTS

| | | |
|---|---|---|
| EP | 1 641 225 A1 | 3/2006 |
| EP | 2 023 583 A1 | 2/2009 |
| JP | 2008-141519 | 6/2008 |

OTHER PUBLICATIONS

Extended European Search Report issued Apr. 17, 2011, in Patent Application No. 11156048.8.
Rik Myslewski, "Apple iPhoto gets in your face", http://www.theregister.co.uk/2009/02/05/iphoto_09_review/, XP 2570590, Feb. 5, 2010, 7 pages.

* cited by examiner

*Primary Examiner* — Anthony Addy
(74) *Attorney, Agent, or Firm* — Oblon, Spivak, McClelland, Maier & Neustadt, L.L.P.

(57) ABSTRACT

A communication terminal apparatus that includes a personal information obtaining unit configured to obtain contact information about one or a plurality of persons that are a subject of an image; a storage unit configured to store the image in an image address book as an image-attached personal information list item after being added with the contact information obtained by the personal information obtaining unit; a display unit configured to display the image stored in the storage unit; and a control unit configured to cause the display unit to display the image stored in the storage unit when an operation of reading the image-attached personal information list item is performed, and perform a process related to the contact information added to the image in the storage unit when an operation of selecting the one or plurality of persons on the displayed image is performed by a user.

13 Claims, 10 Drawing Sheets

COMMUNICATION TERMINAL APPARATUS AND COMMUNICATION METHOD

CROSS REFERENCE TO RELATED APPLICATIONS

This application is related to and claims priority under 35 U.S.C. §119(e) to Provisional Application Ser. No. 61/318,067, filed Mar. 26, 2010, the contents of which are hereby incorporated herein by reference.

BACKGROUND

1. Field

This specification relates to a communication terminal apparatus and a communication method that are preferably applied to a wireless phone terminal apparatus or the like. Particularly, the present specification relates to a technology applied to a terminal apparatus that stores a personal information list called "telephone book" or "address book".

2. Description of the Related Art

According to the related art, a wireless phone terminal apparatus such as a mobile phone terminal apparatus has a function of storing a personal information list called a "telephone book" or "address book". By displaying the stored personal information list and selecting a name or tile from the displayed list through a user operation, registered personal information of an individual, such as a phone number or an e-mail address, is displayed. Furthermore, making a call using a phone number is performed by selecting the phone number displayed, and creation of an e-mail addressed to an e-mail address is performed by selecting the e-mail address.

The personal information list is basically a list made up of text information, in which registered individuals are listed in alphabetical order or the like so that a user can select a desired individual. Also, there exists a personal information list in which a face image of an individual can be displayed together with a phone number or e-mail address of the individual.

Japanese Unexamined Patent Application Publication No. 2008-141519 describes a technology for storing face images in a personal information list, displaying the list of the face images, selecting an individual by selecting one of the face images, and making a call using the phone number of the selected individual.

However, a personal information list held in a mobile phone terminal apparatus or the like according to the related art is a list obtained through a registration operation performed by a user. Grouping can be performed during creation of the list, but the grouping is performed by a user who performs the registration operation, and thus fine grouping is not performed in an ordinary case. Typically, relatively-coarse grouping is performed, for example, a group related to business and a group related to a private life are generated. Fine grouping is possible, but it becomes difficult to find an individual from a list if the user performs inappropriate grouping during registration of individuals.

Also, in a case of storing information about individuals in a personal information list, face images may also be stored at the same time so that a face image is displayed together with personal information. In this case, however, each face image is not associated with a group. Japanese Unexamined Patent Application Publication No. 2008-141519 describes displaying a list of face images in units of groups, but grouping is performed through a registration operation performed by a user.

Accordingly, it is desirable to appropriately create a personal information list in units of groups in a user-friendly manner.

BRIEF SUMMARY

According to an embodiment, a communication terminal apparatus is provided that includes a personal information obtaining unit configured to obtain contact information about one or a plurality of persons that are a subject of an image; a storage unit configured to store the image in an image address book as an image-attached personal information list item after being added with the contact information obtained by the personal information obtaining unit; a display unit configured to display the image stored in the storage unit; and a control unit configured to cause the display unit to display the image stored in the storage unit when an operation of reading the image-attached personal information list item is performed, and perform a process related to the contact information added to the image in the storage unit when an operation of selecting the one or plurality of persons on the displayed image is performed by a user.

According to another embodiment, a communication method is provided, implemented on a communication terminal apparatus, comprising: obtaining, at a personal information obtaining unit, contact information about one or a plurality of persons that are a subject of an image; storing, at a storage unit, the image in an image address book as an image-attached personal information list item after being added with the contact information obtained by the personal information obtaining unit; displaying, at a display unit, the image stored in the storage unit when an operation of reading the image-attached personal information list item is performed; and performing, at a control unit, a process related to the contact information added to the image in the storage unit when an operation of selecting the one or plurality of persons on the displayed image is performed by a user.

According to another embodiment, a computer readable storage medium is provided, encoded with computer executable instructions, which when executed by a communication terminal apparatus, cause the communication terminal apparatus to perform a method comprising: obtaining, at a personal information obtaining unit, contact information about one or a plurality of persons that are a subject of an image; storing, at a storage unit, the image in an image address book as an image-attached personal information list item after being added with the contact information obtained by the personal information obtaining unit; displaying, at a display unit, the image stored in the storage unit when an operation of reading the image-attached personal information list item is performed; and performing, at a control unit, a process related to the contact information added to the image in the storage unit when an operation of selecting the one or plurality of persons on the displayed image is performed by a user.

Accordingly, making a call or transmission of an e-mail can be performed using a phone number or an address associated with the person. Therefore, for example, by capturing a group photo of a certain group and using the group photo as an image serving as an image-attached personal information list, a telephone book or an address book of the members of the group can be created on the basis of the single photo image.

According to another embodiment, a personal information list of one or a plurality of persons as a subject in an image can be created by using the image, such as an obtained group photo. Therefore, by capturing an image in units of groups or families to create an address book and storing the captured image as an image-attached personal information list, a personal information list in units of specific groups can be easily created. When a user wants to read the personal information list, the user may display a stored image and select a subject, so that information about a desired person can be easily obtained.

DETAILED DESCRIPTION

Figure 9:
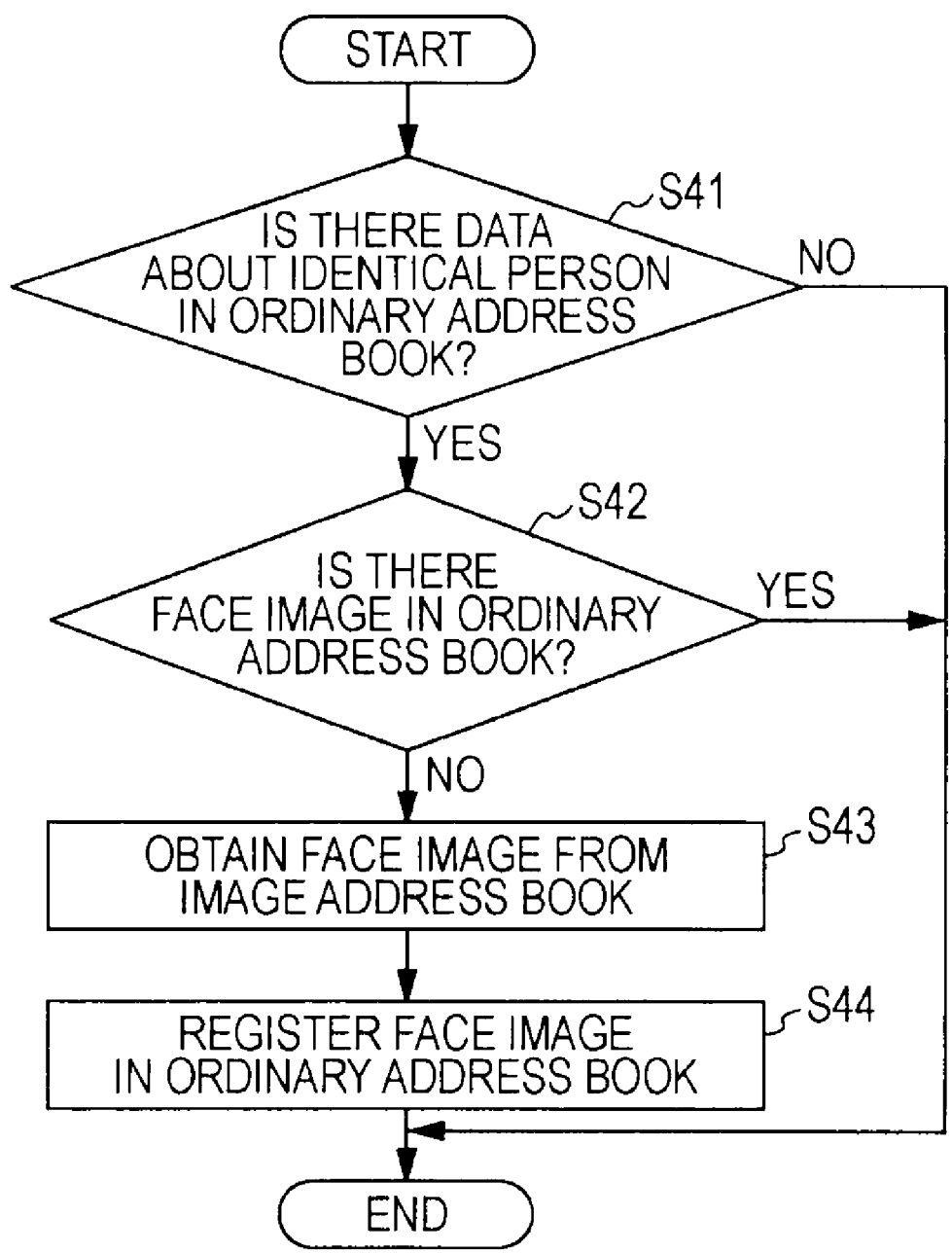
FIG. 9 is a flowchart illustrating an example of a process of registering a face image in ordinary address book data according to a modification of an embodiment.
Figure 10:
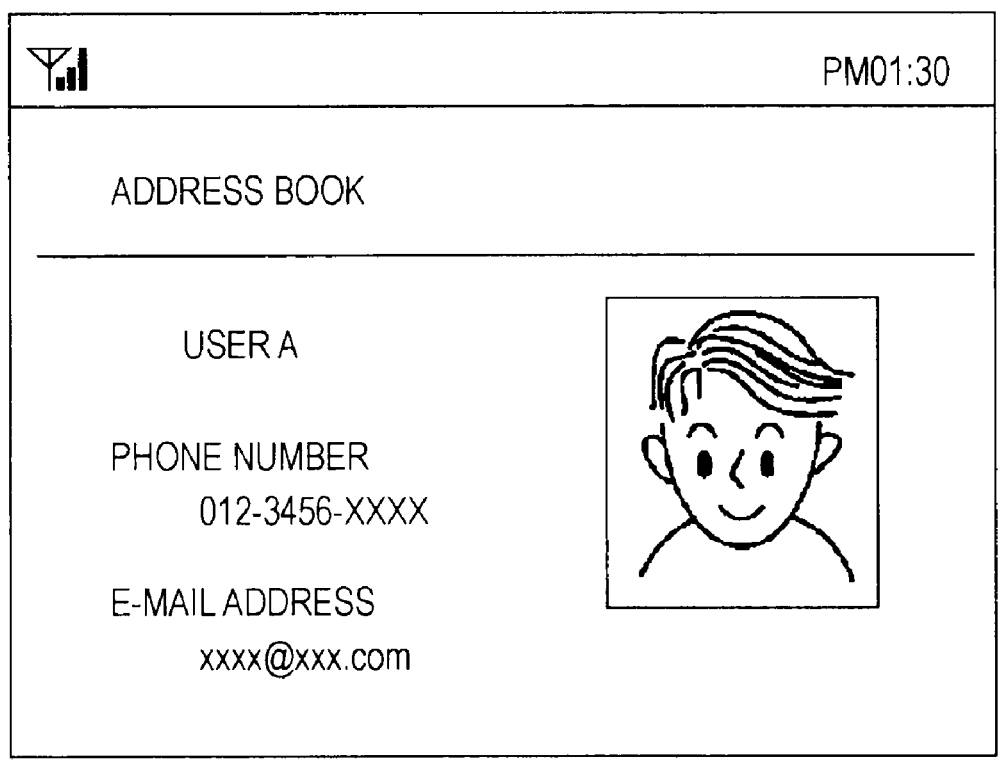
FIG. 10 illustrates a display example of ordinary address book data according to a modification of an embodiment.
Figure 11:
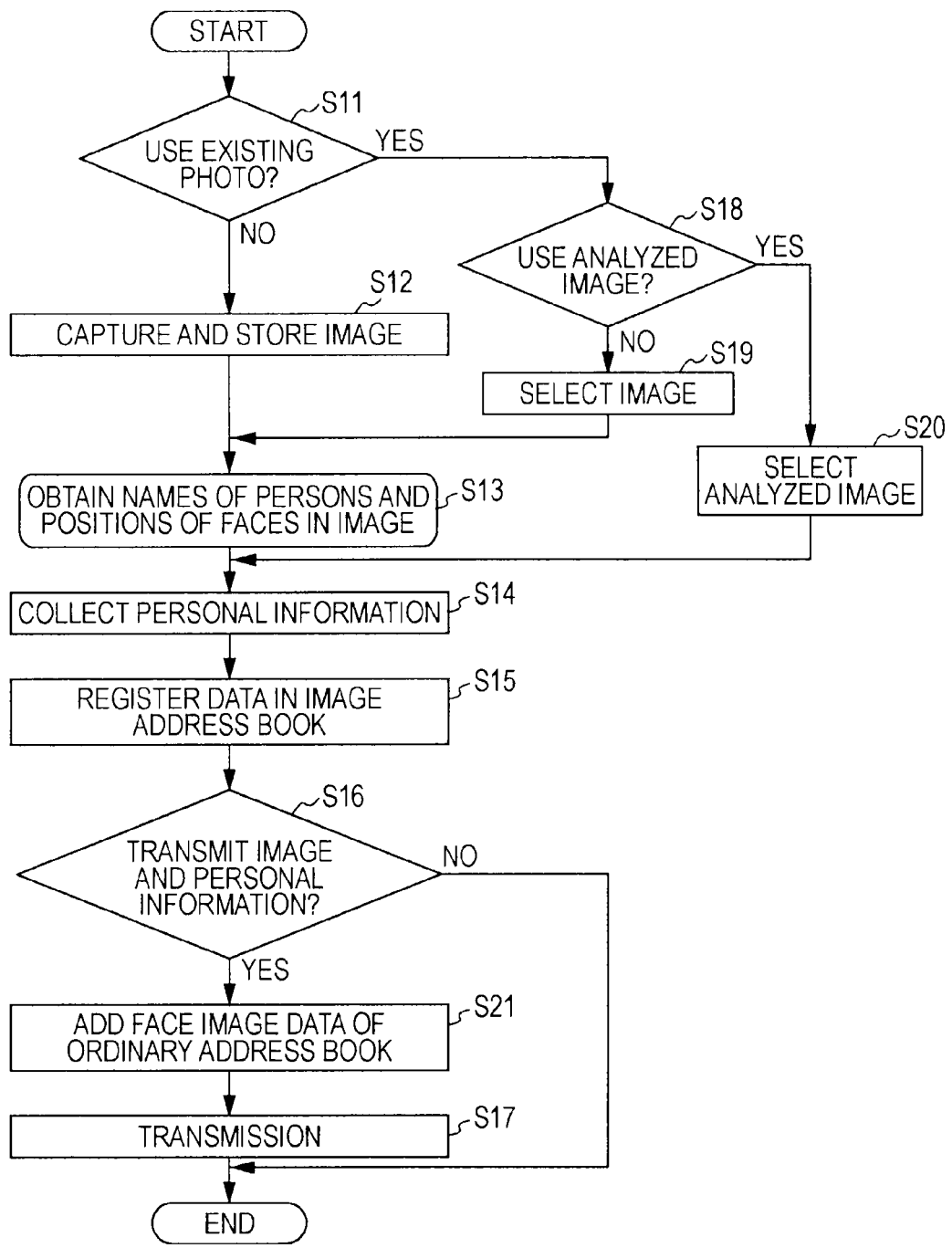
FIG. 11 is a flowchart illustrating an example of a process of registering and transmitting an address book according to a modification of an embodiment.

An embodiment will be described in the following order.
1. Entire system (FIG. 1)
2. Communication terminal apparatus (FIG. 2)
3. Image address book (FIGS. 3 to 8)
4. Modification (FIGS. 9 to 11)

1. Entire System

Figure 1:
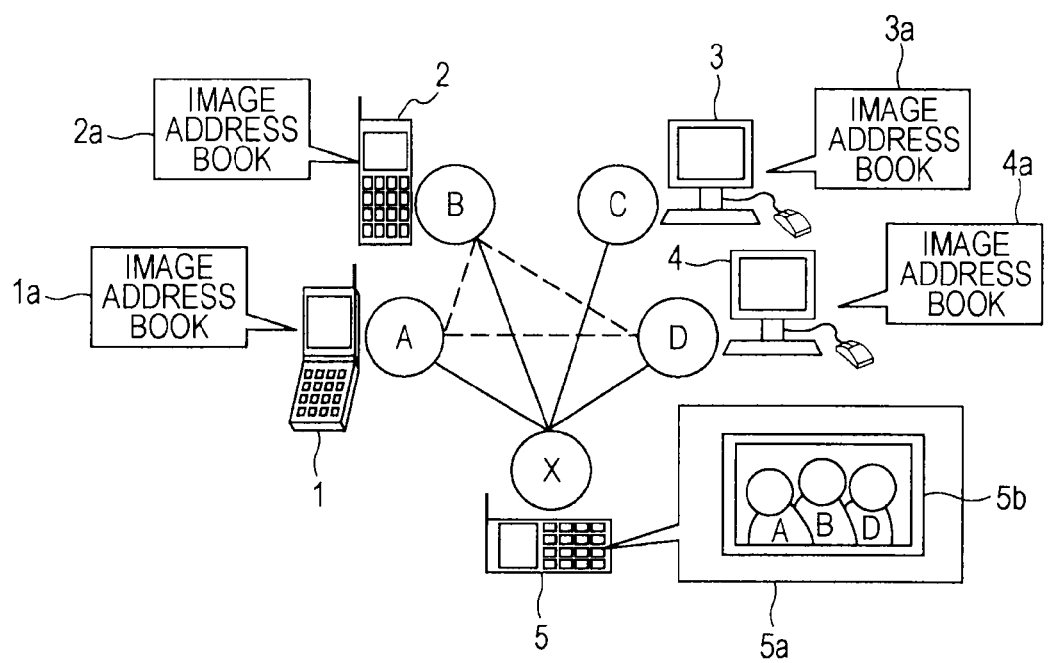
FIG. 1 illustrates an example of a system configuration according to an embodiment.

FIG. 1 illustrates an example of a system configuration according to an embodiment.

FIG. 1 illustrates five communication terminal apparatuses 1 to 5. The communication terminal apparatuses 1 to 5 store image address books 1a to 5a, which are characteristics of this embodiment, respectively. The details of the image address books 1a to 5a will be described below with reference to FIG. 3 and other figures. Shortly, the image address books 1a to 5a are personal information lists with a face image of one or a plurality of persons.

In the description given below, "address book", including an image address book and a photo of a face, means a personal information list containing various pieces of personal information, such as phone numbers and e-mail addresses, and includes a list containing personal information other than e-mail addresses. A list called "electronic telephone book" is also a personal information list that is substantially the same as the address book described in this embodiment.

Referring to FIG. 1, the communication terminal apparatuses 1, 2, and 5 are terminal apparatuses that have a small size for portable use and that have a communication function, such as mobile phone terminal apparatuses or camera apparatuses. The communication terminal apparatuses 3 and 4 are personal computer apparatuses that have a communication function. The communication functions of the respective communication terminal apparatuses 1 to 5 may be diversified, for example, a communication function using a wireless phone system, a communication function using a wired phone system, and a communication function connected to a network such as a wireless local area network (LAN).

In the example illustrated in FIG. 1, the communication terminal apparatuses 1, 2, 3, 4, and 5 are used by users A, B, C, D, and X, respectively. Each of the image address books 1a to 5a contains personal information about all the users except himself/herself.

Data of each of the image address books 1a to 5a stored in the terminal apparatuses 1 to 5 includes image data and personal information attached to the image data, such as e-mail addresses and phone numbers. By displaying an image and selecting a person in the image, a user can create an e-mail addressed to an e-mail address and transmit the created e-mail, or make a call using a phone number, by using personal information associated with the person.

For example, the image address book 5a in the communication terminal apparatus 5 used by the user X contains an image 5b, which includes the users A, B, and D as subjects. The image 5b is displayed and is used as an address book.

2. Communication Terminal Apparatus

Next, a configuration of a communication terminal apparatus 100 will be described with reference to FIG. 2. Here, the communication terminal apparatus 100 is configured as a wireless phone terminal apparatus that is applied to the communication terminal apparatuses 1 to 3 illustrated in FIG. 1.

Figure 2:
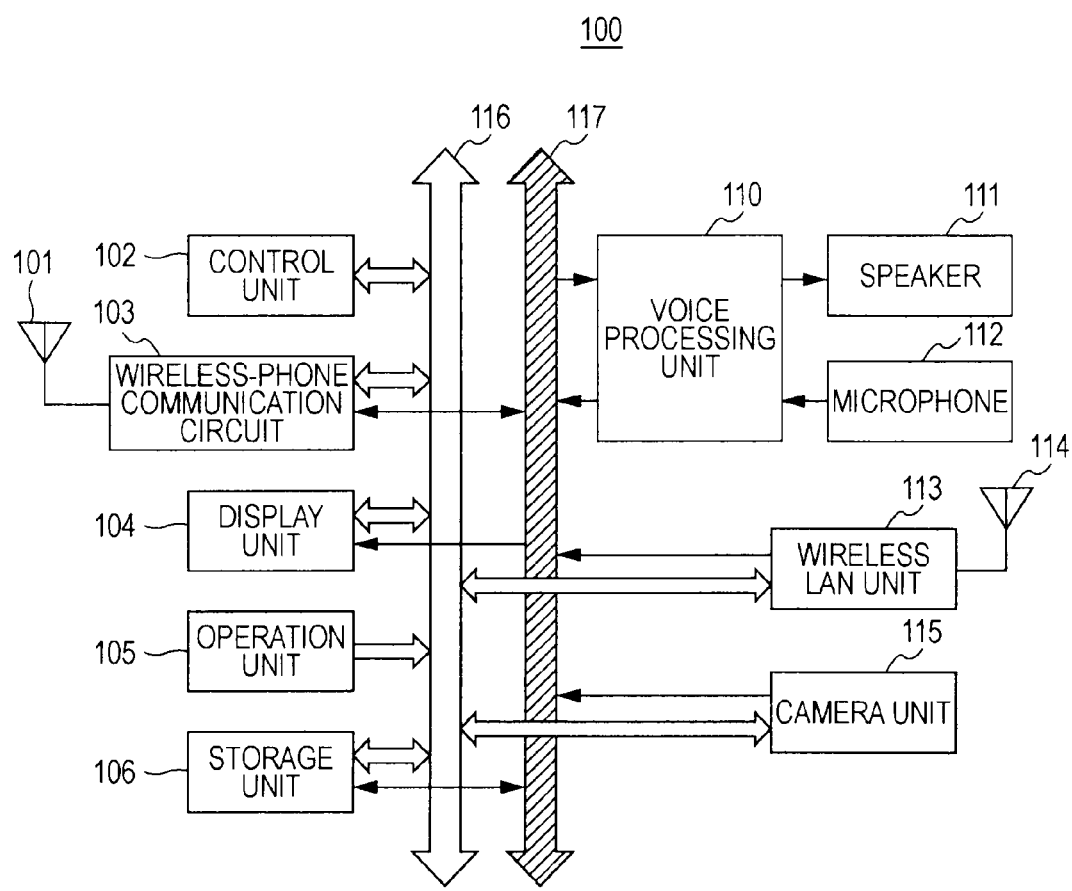
FIG. 2 is a block diagram illustrating a configuration example of a communication terminal apparatus according to an embodiment.

The communication terminal apparatus 100 illustrated in FIG. 2 includes an antenna 101, which is connected to a wireless-phone communication circuit 103. Wireless communication using the wireless-phone communication circuit 103 is performed under control by a control unit 102, which functions as a communication control unit. A process of wireless connection with a wireless-phone base station is controlled by the control unit 102. The control unit 102 transmits control data to/receives control data from each unit in the communication terminal apparatus 100 via a control line 116, and controls each function of the terminal apparatus.

When voice data is contained in a packet received by the wireless-phone communication circuit 103, the voice data is extracted. The voice data extracted from the received packet is supplied to a voice processing unit 110 via a data line 117 and is demodulated into an analog voice signal. The analog voice signal is supplied to a speaker 111, which outputs voice.

Also, the communication terminal apparatus 100 includes a microphone 112 to which voice is input. A voice signal received by the microphone 112 is modulated by the voice processing unit 110 into voice data to be transmitted, and the modulated voice data is supplied to the wireless-phone communication circuit 103. The wireless-phone communication circuit 103 arranges the voice data supplied thereto in a packet that is to be transmitted to a base station, and transmits the packet in a wireless manner.

Also, the communication terminal apparatus 100 includes a display unit 104 including a liquid crystal display panel or the like, which displays various pieces of information under control by the control unit 102. The display performed here includes display related to making or receiving a call, display of registered information, such as an address book and an e-mail address list, display of an incoming or outgoing e-mail, and display of an image downloaded by accessing the Internet. A screen of an image address book described below is also displayed on the display unit 104.

Also, the communication terminal apparatus 100 includes an operation unit 105. The control unit 102 performs various processes on the basis of operations performed in the operation unit 105. For example, making a call using wireless phone communication, transmission/reception of an e-mail, and the start/end of data communication such as access to the Internet are performed by operating a key or the like provided in the operation unit 105. The display panel included in the display unit 104 may be a touch panel that detects a touch with a finger or the like, and detects a position touched via the operation unit 105.

Also, in the communication terminal apparatus 100, a storage unit 106 is connected to the control line 116 and the data line 117. For example, data that is received from the outside and that is necessary to be stored is stored in the storage unit 106. Also, a program necessary for a control process performed by the control unit 102 is stored in the storage unit 106. A program necessary for generating an image address book and a program necessary for generating an ordinary address book made up of text information are also stored in the storage unit 106. Furthermore, data that makes up an image address book or an ordinary address book is stored in an area of the storage unit 106.

Also, the communication terminal apparatus 100 includes a wireless LAN unit 113, which is connected to an antenna 114, so that wireless communication is performed with a neighboring terminal apparatus via a wireless LAN network.

Furthermore, the communication terminal apparatus 100 includes a camera unit 115, so that a still image and a moving image can be captured. Image data obtained through capturing is stored in the storage unit 106 and can be transmitted to the outside from the communication circuit 103 by being attached to an e-mail or the like as necessary.

The control unit 102 has a face detection function for detecting a face image of a person in an image when image data is obtained from the camera unit 115 or the like. The face detection function is necessary for focus adjustment during capturing with the camera unit 115, and is also used for creating an image address book in this embodiment. Furthermore, when face images are stored in the storage unit 106, features of a detected face are compared with those of the stored face images, so as to find a face image that has a high possibility of the identical person.

3. Image Address Book

Next, a description will be given about a process of generating an image address book in the communication terminal apparatus 100 and a process related to the generated image address book, with reference to the flowcharts in FIGS. 3 and 4.

First, in order to generate an image address book, image data serving as a base is obtained. In the case of the communication terminal apparatus 100 illustrated in FIG. 2, image data obtained through capturing by the camera unit 115 is used as the image data serving as a base. Alternatively, image data transmitted from another terminal apparatus or the like may be obtained using the wireless-phone communication circuit 103 or the wireless LAN unit 113.

The image data that is used for generating an image address book is data of an image including one or a plurality of persons to be registered in the address book.

Figure 3:
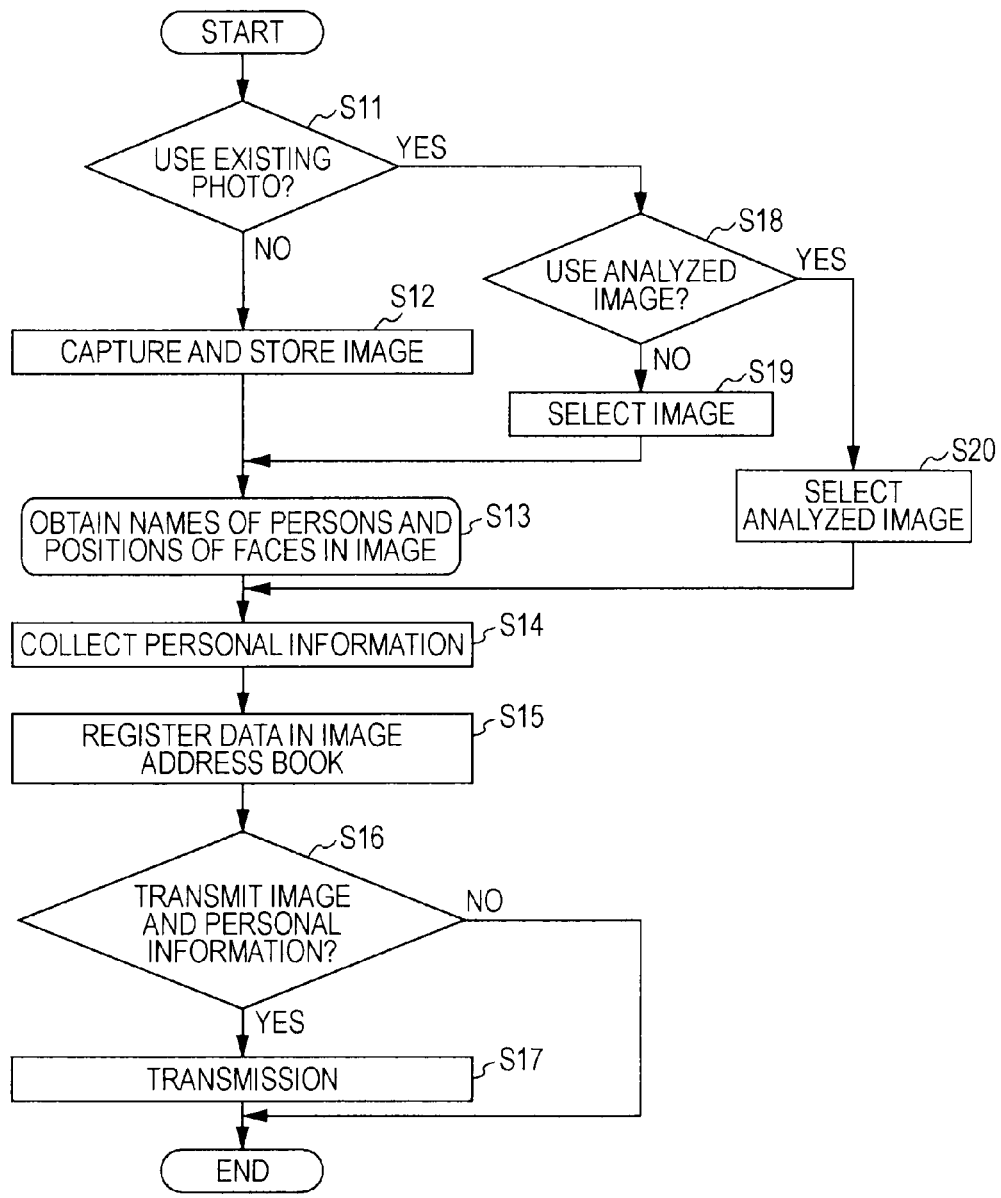
FIG. 3 is a flowchart illustrating an example of a process of registering and transmitting an address book according to an embodiment.

With reference to the flowchart in FIG. 3, a user is caused to determine whether he/she uses image data of an existing photo as image data for generating the image address book (step S11). If the user does not use an existing photo, the camera unit 115 captures an image including one or a plurality of persons to be registered in the image address book as a subject, and the captured image is stored in the storage unit 106 (step S12).

Subsequently, in an image analysis process, the name(s) of the person(s) in the image stored in the storage unit 106 and the coordinate position(s) of the face(s) in the photo (image) are obtained (step S13). The details of the obtaining process will be described below with reference to the flowchart in FIG. 4.

Subsequently, personal information, such as address information and phone number information, of the person(s) having the name(s) obtained in step S13 is collected (step S14). During collection of the personal information, a user uses personal information, such as address information and phone number information, about the person(s) having an identical name stored in a text-information address book, which is an ordinary address book. When data about the person(s) having an identical name is not stored in the text-information address book, personal information such as an e-mail address and a phone number is input through a user operation. Alternatively, personal information such as address information and phone number information may be collected from the outside via a network such as the Internet. When the image includes a person who is not to be registered, classification may be performed to indicate the person, for example, "unknown" or "stranger".

The collected personal information is attached to the image information and is stored in the storage unit 106 as data of the image address book. Accordingly, registration of data in the image address book is completed (step S15).

If the user determines in step S11 to use an existing image stored in the storage unit 106, it is determined whether an image in which the name(s) of person(s) and the coordinate position(s) have been analyzed is to be used or an unanalyzed image is to be used (step S18). If an unanalyzed image is to be used, the user selects an image in step S19, and the process proceeds to step S13 where an analysis process is performed.

Furthermore, if it is determined in step S18 that an analyzed image is to be used, an image to be registered in the image address book is selected from among analyzed images by user operation (step S20). After the selection, the process proceeds to step S14 to collect personal information of each person in the image.

After registration of data in the image address book in step S15 has been completed, it is determined whether it is necessary to transmit the image and personal information to the terminal apparatus(es) of the person(s) who is (are) a subject of the image registered in the image address book (step S16). If it is determined that it is unnecessary to transmit the image and personal information, the process ends. If it is determined that it is necessary to transmit the image and personal information, the registered image data and additional information of the image address book are transmitted to the terminal apparatus(es) of the person(s) as the subject (step S17). Here, the transmission may be performed by using either of a wireless phone system and a wireless LAN function.

By transmitting the image data and additional information to the terminal apparatus(es) in step S17, the same image address book is stored and registered in the terminal apparatus(es) that has (have) received the image data and additional information of the image address book, so that the image address book having the same image can be used. Thus, image address books having the same image can be generated in the respective terminal apparatuses of the members included in the image registered in the image address book.

Next, a description will be given with reference to the flowchart in FIG. 4 about the details of a process of analyzing a face image and obtaining one or a plurality of names and addresses in steps S13 and S14 in the flowchart in FIG. 3.

Figure 4:
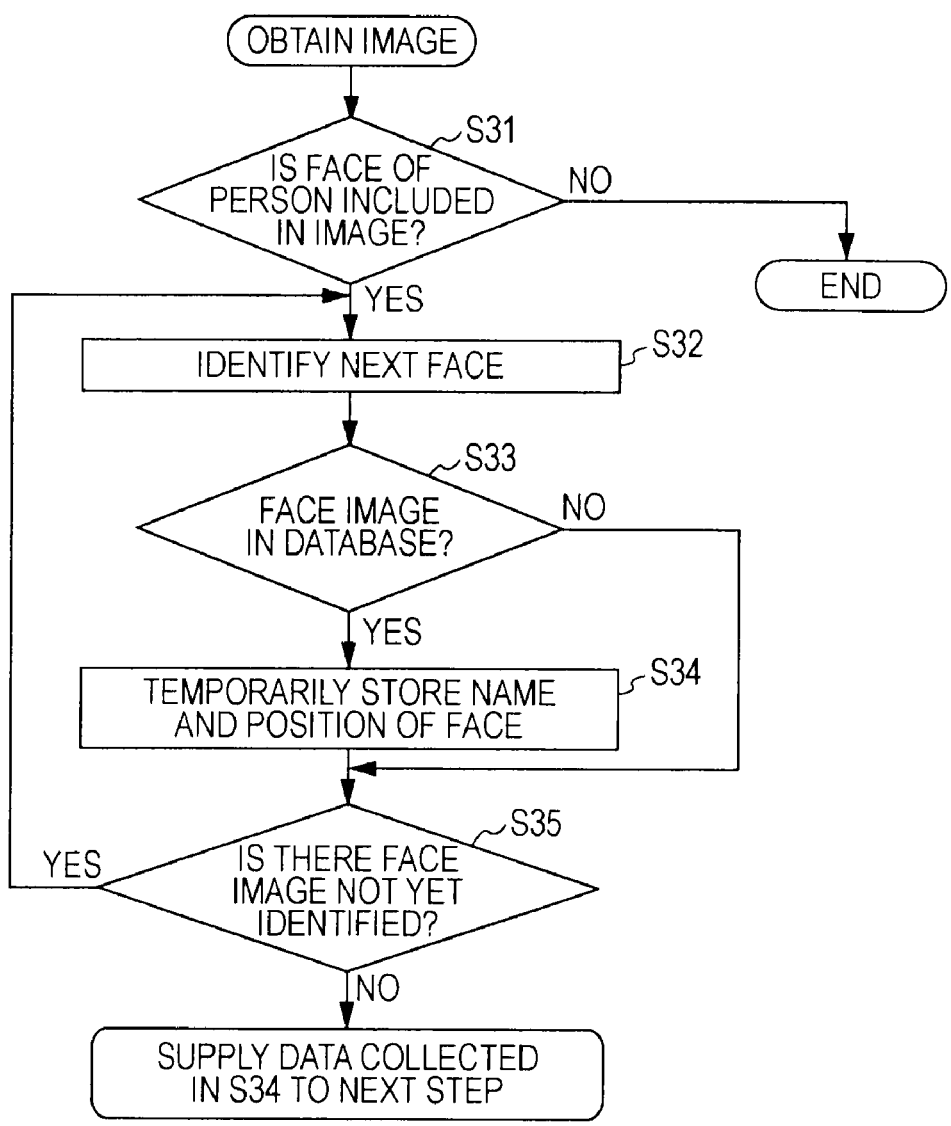
FIG. 4 is a flowchart illustrating an example of a process of registering persons in an image according to an embodiment.

The process illustrated in the flowchart in FIG. 4 is performed under control by the control unit 102.

With reference to FIG. 4, it is determined whether a face of a person is included in an obtained image (step S31). If no face is included, the process ends, and it is determined that the obtained image is not to be registered.

If it is determined in step S31 that a face of a person is included in the image, the next face in the image (first face at first) is identified (step S32). Then, it is determined whether the identified face image exists in a database, such as the storage unit 106 (step S33). Here, if it is determined that the face image exists in the database, the name of the face and the coordinate position of the face in the image are stored in the storage unit 106.

Then, the process proceeds to step S35. If it is determined in step S33 that the face image does not exist in the database, the process proceeds to step S35.

In step S35, it is determined whether a face image that has not yet been identified exists in the image that is currently being analyzed. If a face image that has not yet been identified exists, the process returns to step S32.

If it is determined in step S35 that a face image that has not yet been identified does not exist in the image that is currently being analyzed, the process ends and the obtained data is supplied to the next step (step S15 in the flowchart in FIG. 3).

In this way, when one or a plurality of faces of one or a plurality of persons are included in one image, the names of the respective persons and personal information, such as addresses, are added.

Figure 5:
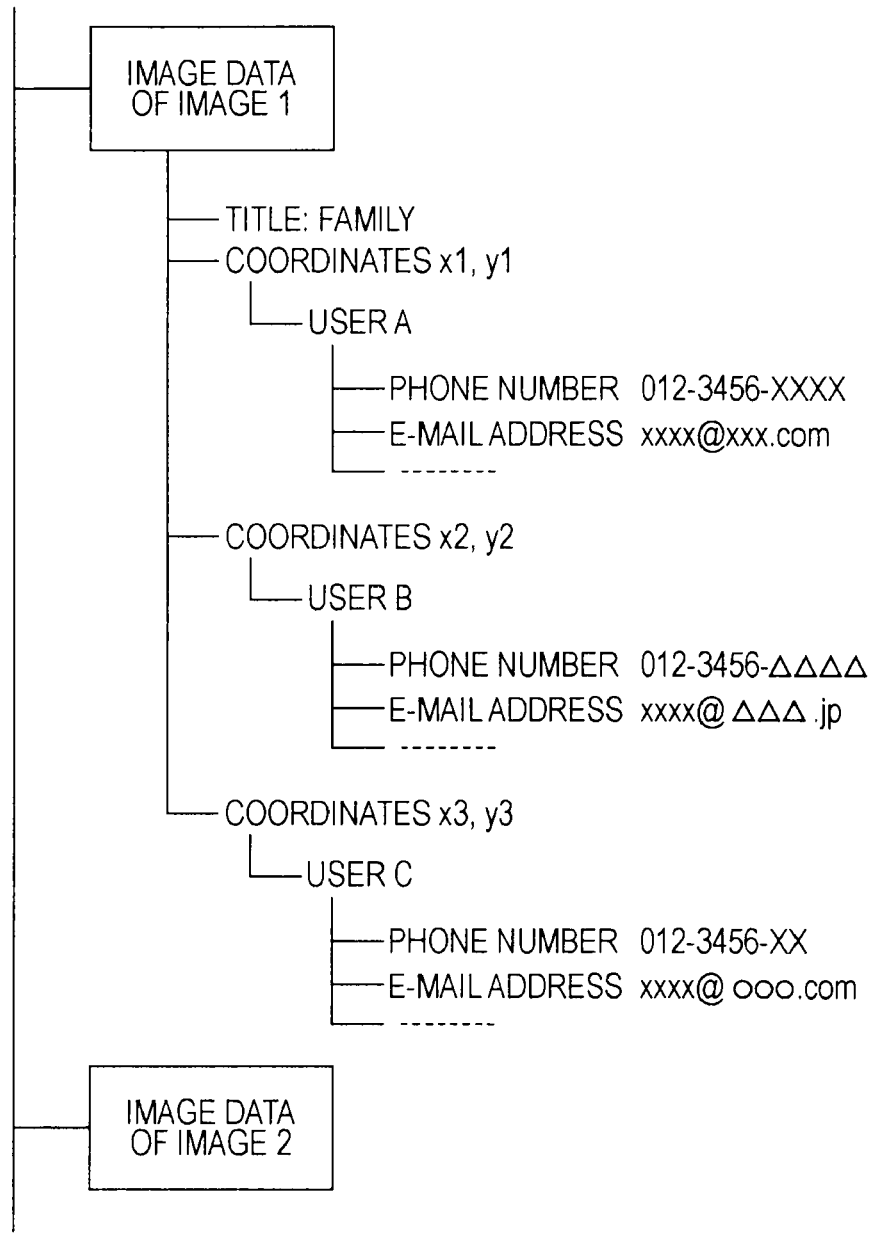
FIG. 5 illustrates a configuration example of address book data according to an embodiment.

FIG. 5 illustrates an example of a schematic configuration of data of the image address book that is generated and stored in the above-described manner.

As illustrated in FIG. 5, pieces of image data (image 1, image 2, . . . ) that are to be registered in an image address book are stored, and titles are added to the respective pieces of image data. The titles are set by a user operation, for example.

Then, the coordinate positions of all the faces in the image are indicated in order. A name, an e-mail address, and a phone number are added to each of the faces at the respective coordinate positions. The coordinate position is a substantially central position of the face image, which is indicated by the number of pixels from an end of the screen in the vertical direction and the number of pixels from an end of the screen in the horizontal direction. In the example illustrated in FIG. 5, one e-mail address and one phone number are added to each face image. When there are a plurality of e-mail addresses or phone numbers, the plurality of e-mail addresses or phone numbers may be added. Alternatively, another piece of personal information, such as an address, may be added.

Figure 6:
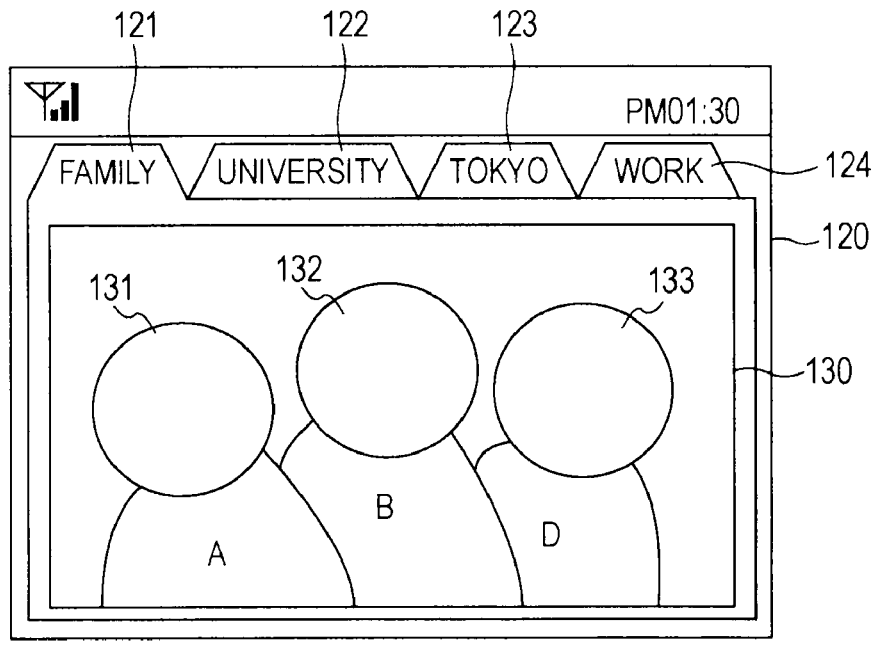
FIG. 6 illustrates a first image display example according to an embodiment.
Figure 7:
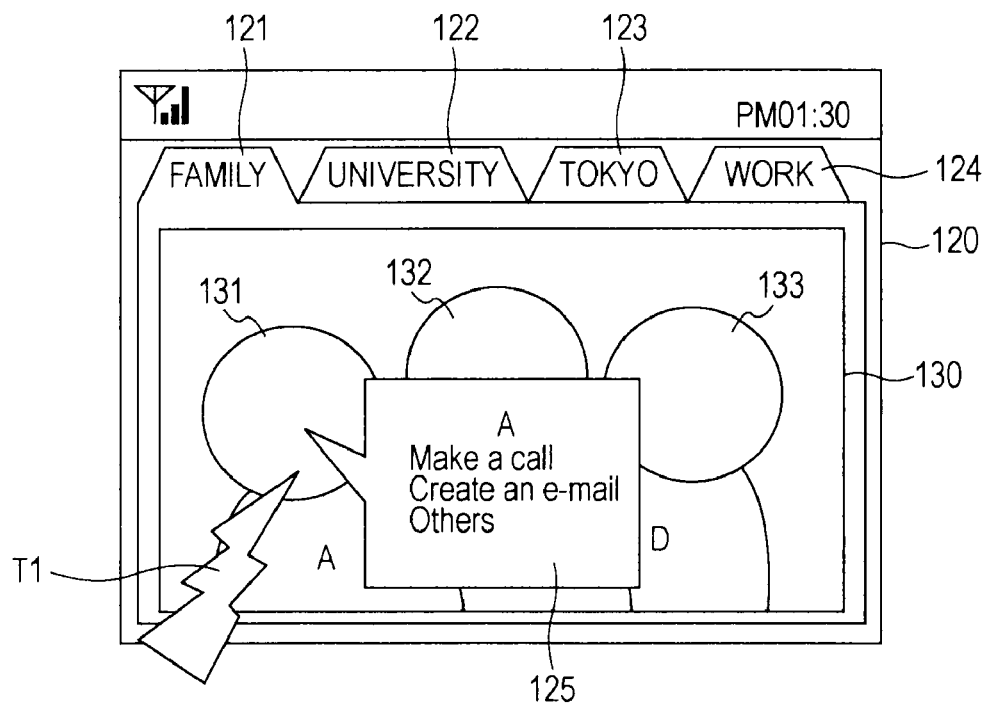
FIG. 7 illustrates a second image display example according to an embodiment.
Figure 8:
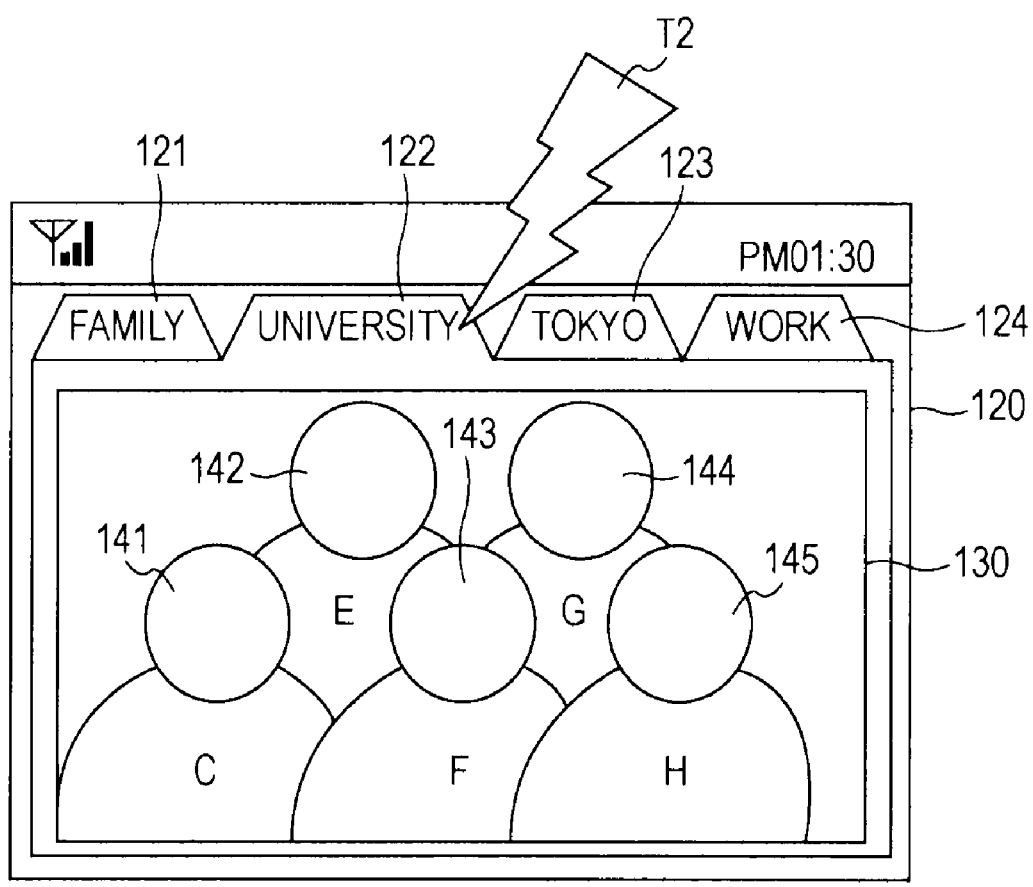
FIG. 8 illustrates a third image display example according to an embodiment.

FIGS. 6 to 8 illustrate an example of a case where an image contained in an image address book is displayed in a communication terminal apparatus to perform operations. Here, assume that the communication terminal apparatus includes a touch panel serving as an operation unit that can be operated when a display screen is touched.

First, the function of the image address book is started. Accordingly, image display with a plurality of tabs 121, 122, 123, and 124 is performed in a display screen 120 of the terminal apparatus, as illustrated in FIG. 6. The number of tabs 121, 122, 123, and 124 corresponds to the number of images registered (stored) in the image address book. Here, four images have been registered. The names given to the images are displayed in characters in the tabs 121, 122, 123, and 124. For example, "family" is registered in the tab 121, "university" is registered in the tab 122, "Tokyo" is registered in the tab 123, and "work" is registered in the tab 124, and the individual names are displayed.

In the example illustrated in FIG. 6, an image 130 is displayed by selecting the tab 121.

In the image 130, faces 131, 132, and 133 of three persons are included, and the names attached to the respective faces are displayed in a text form near the respective faces 131, 132, and 133. Alternatively, the names may not be displayed.

In this state, a user performs an operation of touching the vicinity of any of the faces so as to select the other end of communication. For example, as illustrated in FIG. 7, assume that a user performs a touch operation T1 of touching the vicinity of the face 131 of user A with his/her finger. At this time, a frame 125 extending from the face of user A is displayed. In the frame 125, the name of user A and a list of items that can be realized using the address book are displayed. In this example, "make a call", "create an e-mail", and "others" are displayed.

When "make a call" is selected, for example, a process of making a call using a registered phone number is performed. At this time, the phone number may be displayed.

When "create an e-mail" is selected, for example, a screen for creating an outgoing e-mail addressed to the registered e-mail address appears. After content of the e-mail has been input, the e-mail is transmitted to the address.

When "others" is selected, a screen for modifying a registered address or registered phone number may be displayed.

Although not illustrated, the name of person and the list of items are displayed when the user touches the vicinity of the face 132 or 133.

FIG. 8 illustrates a display example when another tab is selected.

In the case illustrated in FIG. 8, the tab 122 "university" is selected, and the image registered in the tab 122 is displayed. As illustrated in FIG. 8, a touch operation T2 of touching the tab 122 "university" causes the state illustrated in FIG. 6 to change to the state illustrated in FIG. 8.

In this case, an image of faces 141, 142, 143, 144, and 145 of five persons is displayed. By touching any of the faces, a process for making a call or transmitting an e-mail using the registered address of the corresponding person is performed.

According to the above-described embodiment, with an image address book prepared, by displaying an image stored in the image address book and selecting a face in the image, making a call or transmission of an e-mail to the person corresponding to the selected face can be performed. In this case, when faces of a plurality of persons exist in one image, e-mail addresses and phone numbers are registered with respect to the respective face images, and thus registration in the address book in units of groups can be performed very easily and conveniently. For example, when members who belong to a certain group get together, an image of the members is captured by using a camera unit or the like of a communication terminal apparatus, and image data obtained through the capturing is registered in the image address book. Accordingly, an address book of the members is automatically created on the basis of the one image. When a user searches for individual persons registered in the address book, the user performs search using images in units of groups, and thus the search can be performed more easily than in a case of using a name-order address book. Furthermore, even when it is difficult for a user to identify a person on the basis of only the name registered in the address book, the user can determine the group to which the person belongs by seeing an image of the group.

4. Modification

Next, a description will be given about an example of a process of associating data of the image address book according to the embodiment with an address book made up of text information (ordinary address book), with reference to FIGS. 9 and 10.

The address book made up of text information is an address book (telephone book) that is typically held in a mobile phone terminal apparatus or the like, and the display illustrated in FIG. 10 is performed, for example.

FIG. 10 illustrates a screen that is displayed when a specific name is selected from a list of names. In this example, "user A" is selected to display the screen.

As illustrated in FIG. 10, registered information about "user A", such as the name, phone number, and e-mail address, is displayed with characters and numerals. When a face image of "user A" is registered, the face image is also displayed at the same time. In the example illustrated in FIG. 10, the face image is displayed on the right. Note that the face image illustrated in FIG. 10 is displayed only when the image is registered. When the image is not registered, the display area of the face image is blank.

Next, the process illustrated in FIG. 9 will be described. When a new image is registered in an image address book, it is determined whether data about the person identical to the person corresponding to the new image exists in the address book made up of text information on the basis of the name or the like attached to the face in the image (step S41). If the data about the identical person does not exist, the process ends.

When the data about the identical person exists in the address book made up of text information, it is determined whether data of a face image of the person is registered in the address book made up of text information (step S42). The determination of whether the data of the face image exists corresponds to a determination of whether the face image that is displayed in the mode illustrated in FIG. 10 is registered.

If the face image is registered, the process ends.

If the face image is not registered, image data of a face image of the corresponding person extracted from the image registered in the image address book is obtained (step S43). Then, the obtained image data is registered as face image data of the corresponding person in the address book made up of text information (step S44).

In this way, when a face image is registered in the image address book, the face image is automatically registered in the address book made up of text information. Accordingly, an appropriate face image is automatically given to the address book made up of text information.

The process illustrated in the flowchart in FIG. 9 may be performed by a terminal apparatus that generates the image address book. Alternatively, when the generated image address book is transmitted to another terminal apparatus, the process may be performed by the terminal apparatus that has received the transmitted image address book. That is, as in step S17 of the flowchart illustrated in FIG. 3, the data of the image address book may be transmitted to another terminal apparatus. In that case, the terminal apparatus that has received the data extracts a face image from an image when generating an address book made up of text information. In this way, when a person who is not registered in a terminal apparatus on the other end is to be registered, a face image or the like is favorably registered.

Furthermore, when data of an image address book is to be transmitted to another terminal apparatus after the image address book has been generated and registered, data of the address book made up of text information illustrated in FIG. 10 may be transmitted together with the data of the generated image address book, so as to be registered in the terminal apparatus on the other end.

The flowchart in FIG. 11 illustrates an example of a process performed in this case. The flowchart illustrated in FIG. 11 is different from that illustrated in FIG. 3 in that step S21 is performed when a determination "YES" is made in step S16, where it is determined whether the image and address information are to be transmitted to the person(s) as a subject. That is, after it is determined in step S16 that the image and address information are to be transmitted to the person(s) as a subject, the process proceeds to step S21, where data of a face image in the address book made up of text information (that is, data of the face image displayed in the manner illustrated in FIG. 10) is further added to the data of the image address book. The data of the face image may be the face image extracted from the image registered in the image address book in the process illustrated in the flowchart in FIG. 9, or may be another face image that has already been registered as address book information of the person.

Then, the data of the image address book (including additional data) and the data of the face image of the address book made up of text information are transmitted in step S17.

The other steps are the same as those in the flowchart illustrated in FIG. 3.

In a communication terminal apparatus that has received such data, the received data of the image address book is stored as an image address book in a storage unit of the terminal apparatus and is registered. When a person in an image registered in the image address book is also registered in an ordinary address book made up of text information in the communication terminal apparatus, a received face image is registered, so that the same face image as the face image registered in the transmission source can be registered. Also, an operation of registering the face image is unnecessary in the communication terminal apparatus, so that the operation can be simplified.

The above-described embodiment is applied to a communication terminal apparatus, such as a mobile phone terminal apparatus. Also, the above-described embodiment may be applied to various terminal apparatuses provided with a personal information list, such as an address book or a telephone book. For example, the embodiment may be applied to an information processing terminal apparatus, such as a personal computer apparatus. In the case of the information processing terminal apparatus, a program (software) for performing the processes according to the embodiment may be installed into the apparatus, and the above-described processes may be performed in accordance with the program.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal apparatus comprising:
   a personal information obtaining unit configured to obtain contact information about one or a plurality of persons that are a subject of an image;
   a storage unit configured to store the image in an image address book as an image-attached personal information list item after being added with the contact information obtained by the personal information obtaining unit and coordinate information of the one or a plurality of persons in the image, wherein each of the coordinate information corresponds to a substantially central position of a face of each of the one or a plurality of persons in the image, which is indicated by a number of pixels from an end of a screen in a vertical direction and a number of pixels from an end of the screen in a horizontal direction;

a display unit configured to display the image stored in the storage unit;

a control unit configured to cause the display unit to display the image stored in the storage unit when an operation of reading the image-attached personal information list item is performed, and perform a process related to the contact information added to the image in the storage unit when an operation of selecting the one or plurality of persons on the displayed image is performed by a user; and a communication unit configured to transmit the image-attached personal information list item, which includes an image of a recognized person, contact information of the recognized person, and coordinate information of the recognized person in the image, to a receiver-side communication terminal apparatus of the recognized person to cause the receiver-side communication terminal apparatus to store the image-attached personal information list item, wherein the communication terminal apparatus automatically determines whether or not to transmit the image-attached personal information list item to the receiver-side communication terminal apparatus.

2. A communication terminal according to claim 1, further comprising:
an image recognizing unit configured to recognize the one or a plurality of persons in the image.

3. A communication terminal apparatus according to claim 2, wherein the storage unit is configured to store face images and the image recognizing unit is configured to recognize the one or a plurality of persons in the image by comparing a detected face in the image with the stored face images.

4. A communication terminal according to claim 2, further comprising:
an image obtaining unit configured to capture the image.

5. A communication terminal apparatus according to claim 4, wherein the image recognizing unit is configured to recognize one or a plurality of persons in an image obtained by the image obtaining unit or in an image that is previously stored.

6. A communication terminal apparatus according to claim 1, wherein the image address book is sortable by images.

7. A communication terminal according to claim 6, wherein the storage unit is configured to store a personal information list which is sortable by text information and which is separate from the image address book, the personal information list including at least one entry including a name, contact information, and a face image of a person, wherein the face image is extracted from the image that is stored in the image address book.

8. A communication terminal apparatus according to claim 7, wherein when the communication terminal apparatus receives an image-attached personal information list item from another communication terminal apparatus, and contact information in the received image-attached personal information list item is added to a respective entry in the personal information list, and a face image which is extracted from an image in the received image-attached personal information list item is added to the respective entry in the personal information list.

9. A communication terminal apparatus according to claim 1, wherein the display unit is a touch-panel display, in which the one or plurality of persons on the displayed image may be selected by a touch of a user's finger.

10. A communication terminal apparatus according to claim 1, wherein the contact information is at least one of phone number information and e-mail address information.

11. A communication terminal apparatus according to claim 1, wherein the display unit is configured to display a name of a person in the displayed image and one or more options related to the contact information when the operation of selecting the one or plurality of persons on the displayed image is performed.

12. A communication method, implemented on a communication terminal apparatus, comprising:
obtaining, at a personal information obtaining unit, contact information about one or a plurality of persons that are a subject of an image;

storing, at a storage unit, the image in an image address book as an image-attached personal information list item after being added with the contact information obtained by the personal information obtaining unit and coordinate information of the one or a plurality of persons in the image, wherein each of the coordinate information corresponds to a substantially central position of a face of each of the one or a plurality of persons in the image, which is indicated by a number of pixels from an end of a screen in a vertical direction and a number of pixels from an end of the screen in a horizontal direction;

displaying, at a display unit, the image stored in the storage unit when an operation of reading the image-attached personal information list item is performed;

performing, at a control unit, a process related to the contact information added to the image in the storage unit when an operation of selecting the one or plurality of persons on the displayed image is performed by a user; and transmitting, at a communication unit, the image-attached personal information list item, which includes an image of a recognized person, contact information of the recognized person, and coordinate information of the recognized person in the image, to a receiver-side communication terminal apparatus of the recognized person to cause the receiver-side communication terminal apparatus to store the image-attached personal information list item, wherein the communication terminal apparatus automatically determines whether or not to transmit the image-attached personal information list item to the receiver-side communication terminal apparatus.

13. A non-transitory computer readable storage medium, encoded with computer executable instructions, which when executed by a communication terminal apparatus, cause the communication terminal apparatus to perform a method comprising:
obtaining, at a personal information obtaining unit, contact information about one or a plurality of persons that are a subject of an image;

storing, at a storage unit, the image in an image address book as an image-attached personal information list item after being added with the contact information obtained by the personal information obtaining unit and coordinate information of the one or a plurality of persons in the image, wherein each of the coordinate information corresponds to a substantially central position of a face of each of the one or a plurality of persons in the image, which is indicated by a number of pixels from an end of a screen in the vertical direction and a number of pixels from an end of the screen in a horizontal direction;

displaying, at a display unit, the image stored in the storage unit when an operation of reading the image-attached personal information list item is performed;

performing, at a control unit, a process related to the contact information added to the image in the storage unit when an operation of selecting the one or plurality of persons on the displayed image is performed by a user; and transmitting, at a communication unit, the image-attached personal information list item, which includes an image of a recognized person, contact information of the recognized person, and coordinate information of the recognized person in the image, to a receiver-side communication terminal apparatus of the recognized person to cause the receiver-side communication terminal apparatus to store the image-attached personal information list item, wherein the communication terminal apparatus automatically determines whether or not to transmit the image-attached personal information list item to the receiver-side communication terminal apparatus.

* * * * *